(No Model.)
G. W. JESSUP.
SYSTEM OF IRRIGATION.
No. 315,629. Patented Apr. 14, 1885.
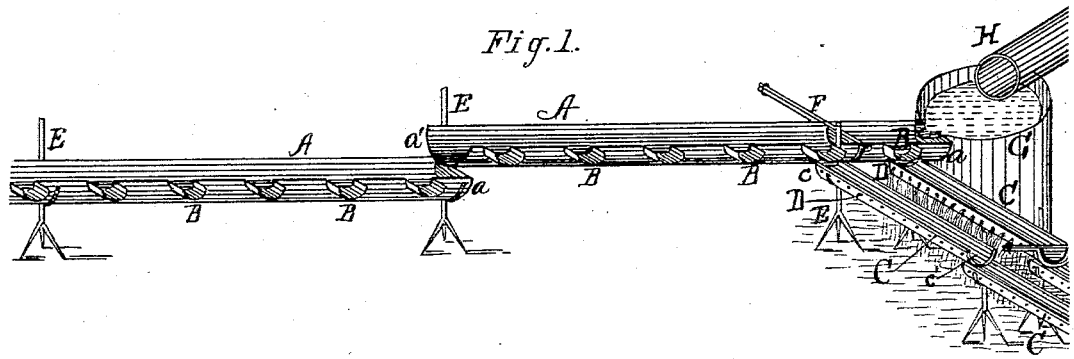
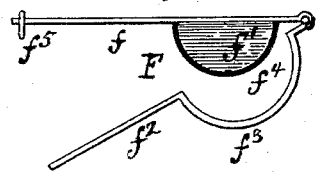
Witnesses.
Wm R. Singleton
[signature]
Inventor.
George W. Jessup,
per Voorhees & Singleton
Attys

UNITED STATES PATENT OFFICE.

GEORGE W. JESSUP, OF CINNAMINSON, NEW JERSEY.

SYSTEM OF IRRIGATION.

SPECIFICATION forming part of Letters Patent No. 315,629, dated April 14, 1885.

Application filed October 15, 1884. (No model.)

*To all whom it may concern:*

Be it known that I, GEORGE W. JESSUP, a citizen of the United States, residing at Cinnaminson, in the county of Burlington and State of New Jersey, have invented certain new and useful Improvements in Systems of Irrigation, of which the following is a specification, reference being had to the accompanying drawings.

Figure 1 is a perspective view of the system or device in position for use, showing the relative arrangement and location of parts; Figs. 2 and 3, views of the clamp-dam; Fig. 4, a view of the adjustable support.

This invention relates to improvements in means of surface irrigation of land; and it consists in the system hereinafter set forth.

In the annexed drawings, the letter A indicates a trough somewhat elliptical in cross-section, the bottom being preferably flattened. One end, $a$, is closed, and the other end, $a'$, open.

Arranged along one edge of the trough A, at proper intervals, are the open-top spouts B, having their bottoms about on the middle horizontal plane of the trough. There may be a number of these troughs A, forming sections of the main conduit of the system, and when in place the open end of one is just over the closed end of the next, as shown in the drawings.

The letter C indicates a trough somewhat like trough A, except that it is smaller, and instead of spouts has holes D made in one or both sides near the top, and has the closed end $c$ and open end $c'$.

The letter E indicates the adjustable support, consisting of the standard $e$ and the arm $e'$, the latter having the curved rest $e^2$, and the eye $e^3$, and set-screw $e^4$, the standard $e$ passing through the eye.

The letter F indicates the clamp-dam. This consists of an arm, $f$, having the curved plate $f'$, faced with rubber $f^4$, so as to be water-tight, and an arm, $f^2$, hinged to arm $f$, and curved at $f^3$, this curve and that of plate $f'$ corresponding. One arm is provided with a ring, $f^5$, for holding the two together when the clamp is closed. There are to be several sizes of this clamp-dam to fit the main and secondary conduits and the spouts.

The letter G indicates a cask or barrel into which the water is emptied, and from the overflow of which it runs into the main conduit.

It is obvious that the parts of this device or system may be made of various material; but sheet-iron is preferable for the troughs and cast-iron for the clamp-dams. This system is used thus: The cask G is placed in a convenient position for receiving water from the well, pump, &c., H, such position being the highest point of the land to be irrigated. The first trough or section A of the main conduit is placed with its closed end $a$ at the overflow of the cask. The second trough or section A is placed with its closed end under the open end of the first trough or section, and so on until all the sections are in place, the main conduit being put along the highest part of the land. In locating the sections the supports E of each are to be adjusted so that each section will be level and the water will only flow by the influx behind. By their adjustment the supports are adapted for uneven ground. The secondary conduit, consisting also of several sections arranged like those of the main conduit, is placed with the closed end of the first section under the first spout B. There may be two or more of these secondary conduits, so that one may be arranged in position while another is in use. A clamp-dam, F, fitting trough A, is clamped over said trough, just beyond the first spout B, which is over the end of the first secondary conduit. A clamp-dam fitting the trough or section C is placed over the open end of the first section of the secondary conduit. Water is then let into the cask G and flows without splash or waste into the main conduit. By the presence of the dam F the water rises, and, flowing through the spout B into the section C and rising therein, owing to the presence of the dam at its end, flows through the holes D, sprinkling the ground around. After sufficient water has run out, the dam is moved to the end of the second section of the secondary conduit, the water falls below the holes in the first section, and runs into the second section and through the holes therein. This operation is continued for all the sections of the first secondary conduit. After the first secondary conduit has been used the dam F of the main conduit is moved beyond the second spout B, a dam suitable to the first spout B closes it, water passes into the second secondary conduit, as already described, and the first secondary conduit is moved to the third spout, ready for use. When the first section A of the main conduit has been used, all the dams are removed and the secondary conduits transferred to the second section of the main conduit. The water runs through the first section of the main conduit without rising to the bottoms of the spouts, and pours into the second section and into the secondary conduits, as already described. This is continued until the whole main circuit is used, when the system is moved to a new place.

It is obvious that a number of immaterial changes and methods may be used. The main conduit may have spouts on both sides. If there is a good head of water, several secondary conduits may be used at one time. The sections of each conduit may be arranged at an angle instead of straight. A spouted section may be used in a secondary conduit, so as to use a tertiary conduit, and so on.

Having described my invention, what I claim is—

1. The main conduit A, having the spouts B placed at intervals along its side, and the secondary conduit C, having the perforations $d$, in combination with the removable dam F, said conduits B and C being detached from each other, whereby the dam can be placed at any point in the main conduit and the secondary conduit moved along, as described.

2. The open-topped main conduit A, having the open-topped spouts B placed at intervals along its side, and the secondary open-topped conduit C, having the holes D, in combination with the clamping-dam F, said conduits B and C being detached from each other, as and for the purpose set forth.

3. The main conduit A, having one end closed and the other open, and the spouts B placed at intervals along its side, and the second main conduit A constructed like the first, in combination with the supports E, the open end of the first conduit resting on the closed end of the second, and both such ends held by a support, E, as set forth.

4. As a means of guiding water in a system for irrigating, the removable clamp-dam F, consisting of the arm $f$, having the curved plate $f'$, and the arm $f^2$, having the curve $f^3$.

In testimony whereof I affix my signature in presence of two witnesses.

GEORGE W. JESSUP.

Witnesses:
GEORGE D. BURR,
JOSEPH LIPPINCOTT.